United States Patent
Reams

(10) Patent No.: US 8,305,249 B2
(45) Date of Patent: Nov. 6, 2012

(54) SYSTEMS AND METHODS FOR CONTROLLING POWER CONSUMPTION IN ELECTRONIC DEVICES

(75) Inventor: William R. Reams, Englewood, CO (US)

(73) Assignee: EchoStar Technologies, L.L.C., Englewood, CO (US)

( * ) Notice: Subject to any disclaimer, the term of this patent is extended or adjusted under 35 U.S.C. 154(b) by 968 days.

(21) Appl. No.: 12/175,897

(22) Filed: Jul. 18, 2008

(65) Prior Publication Data

US 2010/0013551 A1 Jan. 21, 2010

(51) Int. Cl.
*H04L 17/02* (2006.01)

(52) U.S. Cl. .......................................... 341/176

(58) Field of Classification Search .................. 341/176
See application file for complete search history.

(56) References Cited

U.S. PATENT DOCUMENTS

| | | |
|---|---|---|
| 4,067,000 A | 1/1978 | Carlson |
| 4,231,026 A | 10/1980 | Sullivan |
| 4,578,671 A | 3/1986 | Flowers |
| 4,598,243 A | 7/1986 | Kawakami |
| 5,115,236 A | 5/1992 | Kohler |
| 5,164,652 A | 11/1992 | Johnson et al. |
| 5,204,657 A | 4/1993 | Prosser et al. |
| 5,294,915 A | 3/1994 | Owen |
| 5,455,560 A | 10/1995 | Owen |
| 5,506,572 A | 4/1996 | Hills et al. |
| 5,519,760 A | 5/1996 | Borkowski et al. |
| 5,583,491 A | 12/1996 | Kim |
| 5,598,143 A | 1/1997 | Wentz |
| 5,638,050 A | 6/1997 | Sacca et al. |
| 5,684,471 A | 11/1997 | Bernardi et al. |
| 5,705,997 A | 1/1998 | Park |
| 5,926,090 A | 7/1999 | Taylor et al. |
| 5,945,918 A | 8/1999 | McGonigal et al. |
| 5,963,010 A | 10/1999 | Hayashi et al. |

(Continued)

FOREIGN PATENT DOCUMENTS

EP 1435563 7/2004

(Continued)

OTHER PUBLICATIONS

International Search Report dated Jul. 20, 2009, PCT/US2009/037856, 2 pages.

(Continued)

*Primary Examiner* — Jared Fureman
*Assistant Examiner* — Scott Bauer
(74) *Attorney, Agent, or Firm* — Seed IP Law Group PLLC

(57) ABSTRACT

A method of controlling power consumption in an electronic device may include selecting between an on mode of the electronic device in which first circuitry of the electronic device is configured to perform a first operation, an off/standby mode in which second circuitry of the electronic device is configured to perform a second operation, and a sleep/vacation mode in which the second circuitry is controlled to at least one of reduce a frequency of and suspend performance of the second operation. An electronic device may include: first circuitry configured to perform a first operation when the electronic device is in an on mode; second circuitry configured to perform a second operation when in an off/standby mode; and a circuitry controller configured to control the second circuitry to at least one of reduce a frequency of and suspend performance of the second operation when in a sleep/vacation mode.

25 Claims, 5 Drawing Sheets

U.S. PATENT DOCUMENTS

| | | | |
|---|---|---|---|
| 5,990,868 A | 11/1999 | Frederick | |
| 5,999,799 A | 12/1999 | Hu et al. | |
| 6,002,450 A | 12/1999 | Darbee et al. | |
| 6,191,551 B1 | 2/2001 | Fischer et al. | |
| 6,230,277 B1 | 5/2001 | Nakaoka et al. | |
| 6,295,002 B1 | 9/2001 | Fukuda | |
| 6,373,256 B1 | 4/2002 | Hanjani et al. | |
| 6,407,779 B1 | 6/2002 | Herz | |
| 6,449,726 B1 | 9/2002 | Smith | |
| 6,535,125 B2 | 3/2003 | Trivett | |
| 6,573,832 B1 | 6/2003 | Fugere-Ramirez | |
| 6,633,281 B2 | 10/2003 | Lin et al. | |
| 6,664,744 B2 | 12/2003 | Dietz | |
| 6,725,064 B1 | 4/2004 | Wakamatsu et al. | |
| 6,771,182 B1 | 8/2004 | Loh et al. | |
| 6,791,467 B1 | 9/2004 | Ben-Ze'ev | |
| 6,938,101 B2 | 8/2005 | Hayes et al. | |
| 6,985,069 B2 | 1/2006 | Marmaropoulos | |
| 7,009,528 B2 | 3/2006 | Griep | |
| 7,047,333 B2 | 5/2006 | Leung et al. | |
| 7,362,227 B2 | 4/2008 | Kim | |
| 7,411,631 B1* | 8/2008 | Joshi et al. | 348/734 |
| 7,474,248 B2 | 1/2009 | Nakamura et al. | |
| 7,738,792 B2 | 6/2010 | Flachs et al. | |
| 7,757,105 B2 | 7/2010 | Okazaki | |
| 7,852,255 B2 | 12/2010 | Rapisarda | |
| 7,907,060 B2 | 3/2011 | Reams | |
| 8,009,054 B2 | 8/2011 | Reams | |
| 8,082,455 B2 | 12/2011 | Reams | |
| 2002/0085128 A1 | 7/2002 | Stefanik | |
| 2002/0093481 A1 | 7/2002 | Kehlstadt | |
| 2002/0126094 A1 | 9/2002 | Junod et al. | |
| 2003/0026424 A1 | 2/2003 | McGarrahan et al. | |
| 2003/0035074 A1 | 2/2003 | Dubil et al. | |
| 2003/0145242 A1* | 7/2003 | Derocher et al. | 713/320 |
| 2003/0159146 A1 | 8/2003 | Kim | |
| 2004/0095152 A1 | 5/2004 | Ho | |
| 2004/0096051 A1 | 5/2004 | Kim et al. | |
| 2004/0148632 A1 | 7/2004 | Park et al. | |
| 2004/0161031 A1 | 8/2004 | Kwentus et al. | |
| 2004/0203374 A1 | 10/2004 | Zilliacus | |
| 2004/0235446 A1 | 11/2004 | Flaherty et al. | |
| 2004/0250273 A1 | 12/2004 | Swix et al. | |
| 2004/0252247 A1 | 12/2004 | Wabiszczewicz | |
| 2005/0033887 A1 | 2/2005 | Kim et al. | |
| 2005/0073497 A1 | 4/2005 | Kim | |
| 2005/0146438 A1 | 7/2005 | Giger et al. | |
| 2006/0017581 A1 | 1/2006 | Schwendinger et al. | |
| 2006/0034611 A1 | 2/2006 | Li | |
| 2006/0081771 A1 | 4/2006 | Eliad Wardimon | |
| 2007/0018845 A1 | 1/2007 | Sutardja | |
| 2007/0060823 A1 | 3/2007 | Giroux et al. | |
| 2007/0130609 A1 | 6/2007 | Han et al. | |
| 2007/0185968 A1 | 8/2007 | White et al. | |
| 2007/0279332 A1 | 12/2007 | Fryer et al. | |
| 2008/0040758 A1 | 2/2008 | Beetcher et al. | |
| 2008/0098426 A1 | 4/2008 | Candelore | |
| 2008/0163049 A1 | 7/2008 | Krampf | |
| 2008/0267435 A1 | 10/2008 | Schumaier | |
| 2008/0312852 A1 | 12/2008 | Maack | |
| 2009/0002218 A1 | 1/2009 | Rigazio et al. | |
| 2009/0007001 A1 | 1/2009 | Morin et al. | |
| 2009/0077396 A1* | 3/2009 | Tsai et al. | 713/310 |
| 2009/0122206 A1 | 5/2009 | Jung | |
| 2009/0174653 A1 | 7/2009 | Shin et al. | |
| 2009/0241052 A1 | 9/2009 | Ha et al. | |
| 2009/0243909 A1 | 10/2009 | Reams | |
| 2009/0249086 A1 | 10/2009 | Reams | |
| 2009/0262254 A1 | 10/2009 | Reams | |
| 2009/0278701 A1 | 11/2009 | Reams | |
| 2009/0303097 A1 | 12/2009 | Reams et al. | |
| 2009/0328232 A1 | 12/2009 | Safford, Iii | |
| 2011/0163886 A1 | 7/2011 | Reams | |
| 2011/0285540 A1 | 11/2011 | Reams | |

FOREIGN PATENT DOCUMENTS

| | | |
|---|---|---|
| EP | 1617315 | 1/2006 |
| EP | 1884869 | 2/2008 |
| GB | 2331610 | 5/1999 |
| GB | 2347592 | 9/2000 |
| GB | 2398138 | 8/2004 |
| JP | 01114298 | 5/1989 |
| JP | 04148499 | 5/1992 |
| JP | 10334380 | 12/1998 |
| JP | 00130848 | 5/2000 |
| JP | 2001-268658 | 9/2001 |
| JP | 04092946 | 3/2004 |
| JP | 06020386 | 1/2006 |
| JP | 2008-028584 | 2/2008 |
| KR | 2009-0047831 | 5/2009 |
| WO | WO 2007/023437 | 3/2007 |
| WO | WO 2007/086633 | 8/2007 |
| WO | WO 2008/146095 | 12/2008 |

OTHER PUBLICATIONS

International Search Report dated Jun. 24, 2009, PCT/US2009/037871, 4 pages.

International Search Report dated Jul. 8, 2009, PCT/US2009/042651, 5 pages.

International Search Report dated Aug. 27, 2009, Pst/US2009/044302, 3 pages.

International Search Report dated May 26, 2010, PCT/US2010/026694, 4 pages.

International Search Report dated Jul. 2, 2009, PCT/US2009/039948, 5 pages.

Osoinach, Bryce, "Proximity Capacitive Sensor Technology for Touch Sensing Applications," Proximity Sensing White Paper prepared for Freescale Semiconductor, Inc., Tempe, Arizona, 2007, 12 pages.

Preliminary Amendment dated Sep. 15, 2010, U.S. Appl. No. 12/056,819, 5 pages.

Preliminary Amendment dated Mar. 12, 2010, U.S. Appl. No. 12/056,520, 7 pages.

Office Action dated Oct. 8, 2010, U.S. Appl. No. 12/056,520, 11 pages.

Amendment and Response to Office Action dated Jan. 10, 2011, U.S. Appl. No. 12/056,620, 8 pages.

Office Action dated Jan. 27, 2011, U.S. Appl. No. 12/056,620, 11 pages.

Office Action dated Jun. 25, 2010, U.S. Appl. No. 12/177,628, 20 pages.

Amendment and Response to Office Action dated Oct. 25, 2010, U.S. Appl. No. 12/177,628, 20 pages.

Notice of Allowance and Fee(s) Due dated Jan. 6, 2011, U.S. Appl. No. 12/177,628, 12 pages.

Office Action dated Feb. 14, 2011, U.S. Appl. No. 12/135,370, 22 pages.

Office Action dated Mar. 3, 2011, U.S. Appl. No. 12/404,848, 11 pages.

Office Action dated Jun. 25, 2010, U.S. Appl. No. 12/104,291, 18 pages.

Amendment and Response to Office Action dated Oct. 25, 2010, U.S. Appl. No. 12/104,291, 21 pages.

Final Office Action dated Jan. 6, 2011, U.S. Appl. No. 12/104,291, 18 pages.

Amendment and Response to Final Office Action and Terminal Disclaimer dated Mar. 7, 2011, U.S. Appl. No. 12/104,291 15 pages.

Reams, William, U.S. Appl. No. 12/056,819, filed Mar. 27, 2008 entitled "Reduction of Power Consumption in Remote Control Electronics".

Reams, William, U.S. Appl. No. 12/056,520, filed Mar. 27, 2008 entitled "Systems and Methods for Controlling the Power State of Remote Control Electronics".

Reams, William, et al, U.S. Appl. No. 12/135,370, filed Jun. 9, 2008 entitled "Systems, Methods and Apparatus for Changing an Operational Mode of a Remote Control".

Reams, William, et al, U.S. Appl. No. 12/404,848, filed Mar. 16, 2009 entitled "Backlighting Remote Controls".

Japanese Office Action dated Mar. 8, 2011, JP 2011-501939, 3 pages.
European Office Action dated Jul. 4, 2011, EP 09726361.0, 4 pages.
Amendment and Response to Office Action dated Mar. 23, 2011, U.S. Appl. No. 12/056,620, 8 pages.
Terminal Disclaimer dated Mar. 23, 2011, U.S. Appl. No. 12/056,520, 1 page.
Final Office Action dated Apr. 15, 2011, U.S. Appl. No. 12/056,520, 10 pages.
Advisory Action dated Jun. 29, 2011, U.S. Appl. No. 12/056,520, 3 pages.
Request for Continued Examination dated Jul. 15, 2011, U.S. Appl. No. 12/056,520, 1 page.
Notice of Allowance and Fee(s) Due dated Sep. 2, 2011, U.S. Appl. No. 12/056,520, 8 pages.
Amendment and Response to Office Action dated Apr. 19, 2011, U.S. Appl. No. 12/135,370, 15 pages.
Final Office Action dated Jun. 9, 2011, U.S. Appl. No. 12/135,370, 22 pages.
Amendment and Response to Office Action dated Aug. 5, 2011, U.S. Appl. No. 12/135,370, 14 pages.
Request for Continued Examination dated Sep. 7, 2011, U.S. Appl. No. 12/135,370, 1 page.
Amendment and Response to Office Action dated May 20, 2011, U.S. Appl. No. 12/404,848, 12 pages.
Notice of Allowance dated May 3, 2011, U.S. Appl. No. 12/104,291, 8 pages.
Office Action dated Nov. 17, 2010, U.S. Appl. No. 12/056,819, 15 pages.
Office Action dated Oct. 26, 2011, U.S. Appl. No. 12/135,370, 29 pages.

* cited by examiner

SYSTEMS AND METHODS FOR CONTROLLING POWER CONSUMPTION IN ELECTRONIC DEVICES

CROSS-REFERENCE TO RELATED APPLICATION

This application is related to U.S. Nonprovisional patent application Ser. No. 12/056,819, entitled "Reduction of Power Consumption in Remote Control Electronics," filed on Mar. 27, 2008, and to U.S. Nonprovisional patent application Ser. No. 12/056,520, entitled "Systems and Methods for Controlling the Power State of Remote Control Electronics," filed on Mar. 27, 2008, each of which is hereby incorporated by reference in its entirety.

FIELD OF THE INVENTION

The present invention relates generally to electronic devices, and more particularly to systems and methods for controlling power consumption in electronic devices.

BACKGROUND ART

Advancements in consumer electronic devices have led to a wide variety of such devices that may be powered from an AC power source, such as an electrical outlet in a home. Many of such devices are placed in an off/standby mode when turned off. In the off/standby mode, these devices typically continue to require some power and draw some current.

Further, some devices may continue to perform certain operations even when turned off or in a standby mode. For example, a set top box (STB) for receiving programming signals and other information related to the programming and/or the operation of the STB may be monitoring its receiver or other input even when the STB is in an off/standby mode. In particular, programming information in the form of an electronic program guide (EPG) and/or firmware updates may be received by the STB when in the off/standby mode so that the EPG and/or firmware of the STB may be updated for use when the STB is next turned on by the user.

Still further, the STB may be configured to continue to decode programming signals when in the off/standby mode so that the STB can provide a "quick on" capability, that is, immediately or nearly immediately providing decoded video signals to an output device, such as a television or monitor, upon being turned on.

Advancements in consumer electronic devices have also led to a wide variety of such devices that may be operated remotely, i.e., at a distance from the device, using an associated remote control. Most remote controls are hand-held devices that provide a user interface, such as a keypad, touchpad, or the like, for a user to select various functions of the corresponding device or devices to be controlled. Also, most remote controls are wireless, battery-powered devices to facilitate their portability to locations from which the user may wish to control the corresponding device(s). Common wireless remote controls are configured to communicate with the device(s) to be controlled via various known wireless modes, such as infrared, radiowave, or the like.

BRIEF SUMMARY

For electronic devices that continue to perform certain operations even when turned off or in a stand-by mode, this disclosure contemplates a "sleep" or "vacation" mode in which such devices the may suspend such operations and/or reduce a frequency of such operations. Such a sleep/vacation mode may allow such devices to reduce the amount of power required.

This disclosure also contemplates a similar sleep/vacation mode for remote control devices that continue to perform certain operations even when not being operated by a user. Such a sleep/vacation mode may prolong battery life for such remote control devices.

Thus, various systems and methods disclosed herein may control power consumption in electronic devices and/or remote control devices electronics by providing a sleep/vacation mode of the devices in which operations normally performed in an off/standby mode of the devices are either not performed or are performed less frequently. For example, various systems and methods described herein may selectively place an electronic device and/or a remote control device in one of three modes: a first or on mode in which the device(s) is configured to perform a certain number of different operations; a second, off or standby mode in which the device(s) is configured to perform less than the certain number of different operations; and, a third, sleep, or vacation mode in which the device(s) is configured to perform either no operations or one or more operations performed in the off/standby mode less often than in the second (off/standby) mode.

One embodiment may take the form of a method of controlling power consumption in an electronic device including at least three modes. The method may include: from either a first mode of the electronic device in which first circuitry of the electronic device is configured to perform a first operation or a second mode of the electronic device in which second circuitry of the electronic device is configured to perform a second operation, entering a third mode of the electronic device for a set period of time in response to an input, the third mode configuring the electronic device to control the second circuitry to at least one of reduce a number of occurrences (or frequency) of and suspend performance of the second operation.

In some embodiments, the method may also include restoring the number of occurrences of or resuming performance of the second operation when the electronic device is changed from the third mode to one of the first mode and the second mode.

In some embodiments, the operation of entering the third mode may be in accordance with a timer. In such embodiments, the method may further include restoring the number of occurrences of or resuming performance of the second operation prior to and/or upon expiration of the timer. In some embodiments, the timer may occur periodically.

Another embodiment may take the form of an electronic device. The device may include: first circuitry configured to perform a first operation when the electronic device is in a first mode; second circuitry configured to perform a second operation when the electronic device is in a second mode; and a circuitry controller configured to control the second circuitry to at least one of reduce a frequency (or number of occurrences) of and suspend performance of the second operation when the electronic device is in a third mode.

In some embodiments, the circuitry controller may be configured to restore the frequency of or resume performance of the second operation when the electronic device changes from the third mode to one of the first mode and the second mode.

In some embodiments, the device may further include a timer configured to set a duration of the third mode for the electronic device. In such embodiments, the circuitry controller may be configured to restore the frequency of or resume performance of the second operation prior to and/or upon expiration of the timer.

In some embodiments, the device may further include a timer controller configured to set the timer. In some embodiments, the timer controller may be configured to set the timer to occur periodically.

Another embodiment may take the form of a remote control device. The device may include: first circuitry configured to receive user input to wirelessly control an electronic device; second circuitry configured to perform at least one operation without user input; and a circuitry controller configured to control the second circuitry based on a mode of at least one of the remote control device and the electronic device.

In some embodiments, the circuitry controller may be configured to suspend performance of the at least one operation based on the mode of the remote control device or the electronic device. In some embodiments, the circuitry controller may be configured to resume performance of the at least one operation upon receipt of one of a signal from the electronic device and a user input.

In some embodiments, the device may further include a timer. In such embodiments, the circuitry controller may be configured to set the timer based on the mode of the remote control device or the electronic device and to resume performance of the at least one operation prior to and/or upon expiration of the timer.

In some embodiments, the circuitry controller may be configured to reduce a frequency (or number of occurrences) of performance of the at least one operation based on the mode of the remote control device or the electronic device. In some embodiments, the circuitry controller may be configured to restore the frequency of performance of the at least one operation upon receipt of one of a signal from the electronic device and a user input.

In some embodiments, the device may further include a timer. In such embodiments, the circuitry controller may be configured to set the timer based on the mode of the remote control device or the electronic device and to restore the frequency of performance of the at least one operation prior to and/or upon expiration of the timer.

Another embodiment may take the form of a method of operating an entertainment device. The method may include: operating the entertainment device in a first power state; operating the entertainment device in a second power state, the power consumption of the entertainment device in the second power state being less than the power consumption of the entertainment device in the first power state; receiving input requesting to operate the entertainment device in a third power state, the input including a specified time period; operating the entertainment device in the third power state in response to the input, the power consumption of the entertainment device in the third power state being less than the power consumption of the entertainment device in the first power state and the power consumption of the entertainment device in the third power state being different than the power consumption of the entertainment device in the second power state; and switching the entertainment device from the third power state to the first power state or the second power state based on expiration of the specified time period.

In such embodiments, the receiving input may include receiving user input. In such embodiments, the power consumption of the entertainment device in the third power state may be less than the power consumption of the entertainment device in the second power state. In such embodiments, the method may include outputting presentation content from the entertainment device during the first power state. In such embodiments, the first power state may be an active power state, the second power state may be a standby power state and the third power state may be a vacation power state or a sleep power state.

DETAILED DESCRIPTION

Figure 1:
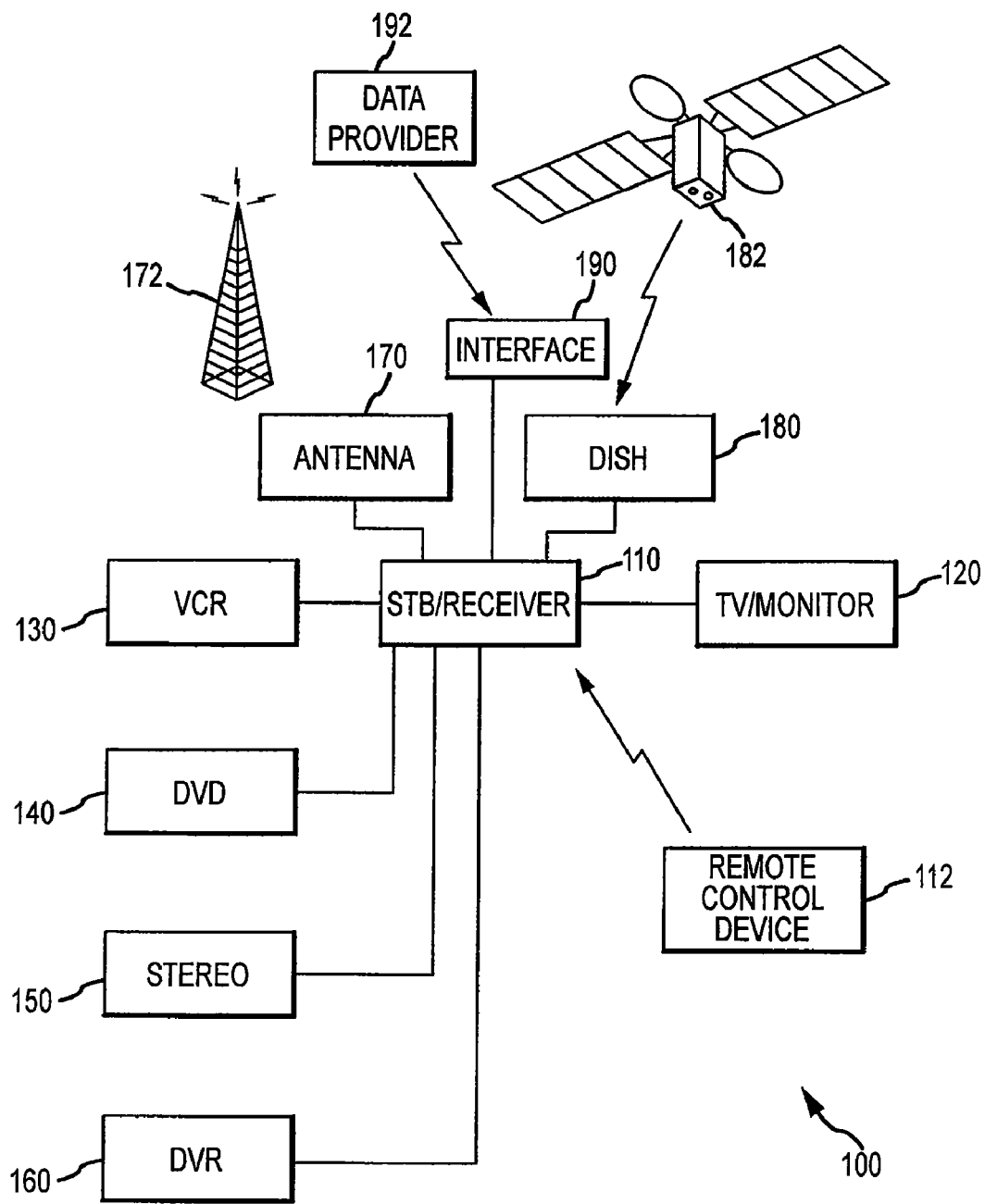
FIG. 1 is a schematic representation of a home entertainment system in which embodiments described herein may be employed.

The following describes various embodiments of systems and methods that may be used to reduce power consumption in an electronic device and in a wireless remote control device. Although specific embodiments may be described in detail, the embodiments disclosed should not be interpreted or otherwise used to restrict the scope of the disclosure provided herein. It should be understood that the following description has broad application, and the discussion of specific embodiments is meant only to be exemplary, and is not intended to represent the only embodiments contemplated and encompassed by this disclosure. References to various "circuitry" herein should be understood to include, but not be limited to, wired circuits, traces, integrated circuits, processors, memories, displays, interfaces, and the like that may be employed to receive input and generate output for controlling an electronic device according to such input, as is well known in the electronic device and remote control electronics arts.

As discussed above, various systems and methods disclosed herein may control the power consumption of an electronic device and/or a remote control device by placing the device(s) in a sleep or vacation mode or state. Various electronic devices may be configured to perform certain operations, and thus consume power, even when placed in an off or standby mode or state.

It should be understood that the name of the mode or state is not of particular importance, and that the terms sleep, vacation and sleep/vacation to refer to the novel mode or power state described herein is for convenience and clarity. It should further be understood that separate "sleep" and "vacation" modes or states may be implemented without going beyond the scope of this disclosure. For simplicity and clarity, only a mode configuration for both "sleep" and/or "vacation" is described. Also, reference to on and off/standby modes is also for the sake of clarity and convenience, and should not be understood to exclude modes with different names. It should also be understood that modes may correspond to power states throughout this description.

An example of an electronic device to which the systems and methods disclosed herein may be applied is a set top box (STB). As discussed above, a STB may monitor its receiver or other input when the STB is in an off/standby mode, and may continue to perform some operations, such as decoding programming signals when in the off/standby mode.

An example of a remote control device to which the systems and methods disclosed herein may be applied is a wireless remote control device that is configured to poll one or more controllable electronic devices for information, such as state information of the controllable electronic device(s). Even when the remote control device is not in use, that is, not receiving user input, or is turned off/placed in standby, the remote control device may continue to poll.

Various systems and methods disclosed herein contemplate a sleep/vacation mode for an electronic device and/or a remote control device in which one or more operations that are performed when the device is in the off/standby mode are suspended and/or performed less frequently, that is less often. Thus, in the case of a STB that monitors for updated EPG information when in the off/standby mode, the monitoring may be suspended or at least performed less frequently in the sleep/vacation mode so that the STB consumes less power in the sleep/vacation mode.

Various systems and methods disclosed herein contemplate that a user may set the device to the sleep/vacation mode for a desired period of time corresponding to a time that the device will not be used or needed. For example, the user may plan to go on vacation and thus not be home to use the device during that time. Further, the user may wish to have the device enter the sleep/vacation mode periodically based on known, recurring times of non-use, such as when the user is away from home at work. Thus, various systems and methods disclosed herein contemplate that a user may set the device to automatically enter and exit the sleep/vacation mode based on programming or otherwise scheduling the sleep/vacation mode of the device.

In general, the sleep/vacation mode may be configured to suspend or reduce a frequency of performance of one or more operations that are not needed when the device is not expected to be used. Thus, depending on the desires of a particular user, the sleep/vacation mode may be employed for any period of time, for vacations, regular or irregular absences, sleeping hours, working hours, or any other time of non-use of the device.

As discussed herein, the systems and methods may be applied to any suitable electronic device, as well as to any suitable remote control device, suitable meaning that the device has one or more operations that are performed in the off/standby mode such that a sleep/vacation mode would serve to reduce energy consumption by the device. Thus, the examples discussed herein are not intended to be exhaustive or otherwise limit the implementations that may be envisioned.

The systems and methods described herein may be employed, for example, in a home entertainment system 100, as illustrated in FIG. 1. It should be understood that a home entertainment system and the components thereof are merely examples of electronic devices to which the systems and method described herein may be applied.

As illustrated, the home entertainment system 100 may include a set top box (STB) or receiver 110 as a main electronic device. A remote control device 112 may be configured to wirelessly control the STB/receiver 110, as well as the other components of the home entertainment system 100, as discussed below. The STB/receiver 110 may be configured to operate as a "hub" or central device for interconnecting various other components of the home entertainment system 100. As described herein, this may facilitate determining state information for the various components and providing such information to the remote control device 112.

The STB/receiver 110 may be configured to receive inputs from an antenna 170, a satellite dish 180, and/or a suitable interface 190 (telephone line, cable, fiber optics, Ethernet, or the like), which are respectively configured to receive over-air signals from a broadcast source 172, satellite signals from a satellite source 182, and signals from a data provider 192. A basic arrangement of the home entertainment system 100 may include the STB/receiver 110, one of the antenna 170, the satellite dish 180, and the interface 190, and a television (TV)/monitor 120. Typically, the antenna 170, the satellite dish 180 and/or the interface 190, and the TV/monitor 120 are coupled to the STB/receiver 110 so that television programs from the broadcast source 172, the satellite source 182 or the data provider 192 may be displayed on the television monitor 120.

In such an arrangement, the remote control device 112 may be configured to control the STB/receiver 110 as well as the TV/monitor 120. Although not illustrated, it may be envisioned that the STB/receiver 110 is coupled to a plurality of TV/monitors 120, for example, for multiple room arrangements. In such case, a plurality of remote control devices 112 may be employed, each associated with one of the TV/monitors 120.

As illustrated in FIG. 1, additional components of the home entertainment system 100 may include a videocassette recorder (VCR) 130, a digital video disc (DVD) player/recorder 140, a stereo 150, and a digital video recorder (DVR). It should be understood that such electronic devices are only examples, and thus not limiting or exhaustive. Further, although each of these components are illustrated as being coupled to the STB/receiver 110, it should be understood that a different electronic device, such as a processor of the stereo 150, a personal computer, or the like, may serve as a main electronic device or central electronic device coupled to the other electronic devices. As described further below, the remote control device 112 may include circuitry configured to control each of the components 130, 140, 150, 160 as auxiliary electronic devices.

Figure 2:
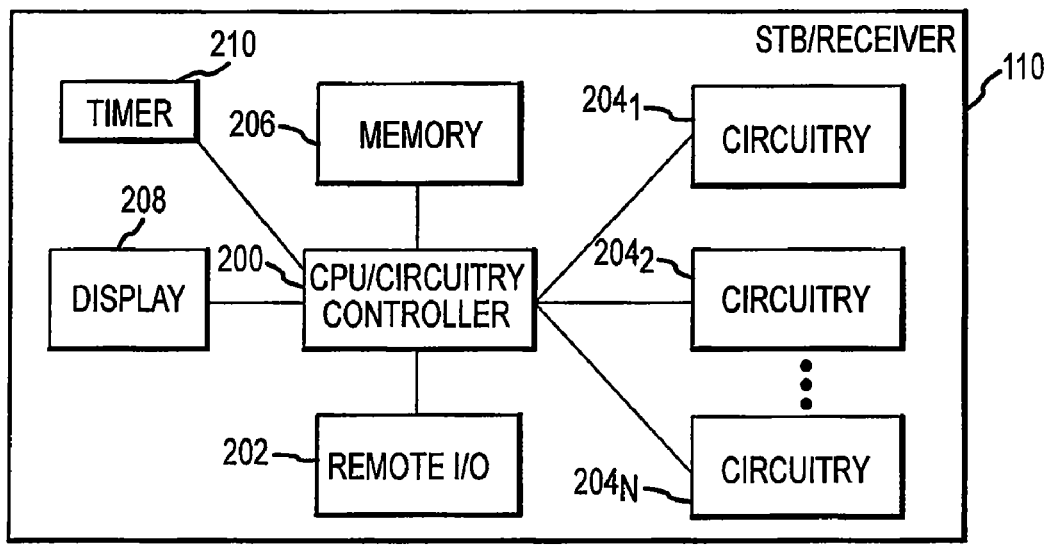
FIG. 2 is a block diagram of a set top box/receiver that may be employed in systems and methods described herein.

In the case of the STB/receiver 110 configured to operate as a main electronic device for interconnecting various other components, one embodiment of the STB/receiver 110 may include features as illustrated in FIG. 2. The STB/receiver 110 may include a processor or central processing unit (CPU)/circuit controller 200 that is coupled to a remote input/output (I/O) device 202 configured to wirelessly communicate with the remote control device 112. It should be understood that the remote I/O device 202 may be one or more devices capable of receiving information from and sending information to the remote control device 112 in any known or hereafter developed manner, such as infrared, radio frequency (RF), or the like. Further, it should be understood that the CPU/circuit controller 200 may be the main processor of the STB/receiver 110 that is configured to perform and/or control various operations and functions of the STB/receiver 110 in addition to those discussed herein, or may be a separate processor, for example, dedicated to the operations and functions associated with controlling circuitry as described herein.

The CPU/circuitry controller 200 may be coupled to various circuitry $204_1$, $204_2$ through $204_N$ that are configured to provide various operations of the STB/receiver 110. Further, the CPU/circuitry controller 200 may be coupled to a memory 206 that is configured to store information regarding the STB/receiver 110 and/or the various circuitry coupled thereto. It should be understood that the memory 206 may be a volatile or non-volatile solid state device, RAM, ROM, EPROM, EEPROM, a hard disk drive, or the like, or any combination thereof.

The STB/receiver 110 may also include a display 208 configured to display various information to a user. Further, the STB/receiver 100 may include a timer 210 configured to be set by the CPU/circuitry controller 200 as described herein.

Figure 3:
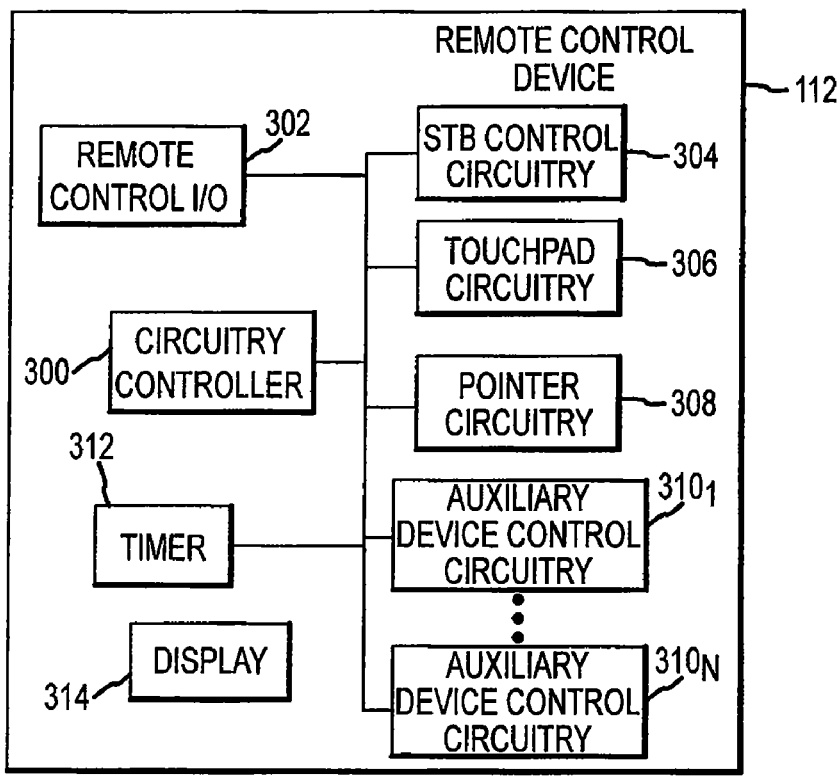
FIG. 3 is a block diagram of a remote control device that may be employed in systems and methods described herein.

In the case of a single remote control device 112, which may be extended as appropriate or desired to arrangements involving multiple remote control devices, one embodiment of the remote control device 112 is illustrated in FIG. 3. The remote control device 112 may include circuitry controller 300 coupled to a remote control input/output (I/O) device 302 that is configured to wirelessly communicate with the STB/receiver 110. It should be understood that the circuitry controller 300 may be any suitable controller, processor, circuitry, or the like, that is capable of performing the operations and functions described herein. Further, it should be understood that the remote control I/O device 302 may be one or more devices capable of receiving information from and sending information to the STB/receiver 110 in any known or hereafter developed manner, such as infrared (IR), radio frequency (RF), or the like.

The remote control device 112 may further include various circuitry configured to receive user input for controlling various electronic devices and functions thereof. As discussed above, the term circuitry is intended to include features such as touchpads and displays, in addition to wired circuits and integrated circuits. The remote control device 112 may include, for example, STB control circuitry 304, touchpad circuitry 306, and pointer circuitry 308. The STB control circuitry 304 may be configured to receive user input for controlling various functions of the STB/receiver 110. The touchpad circuitry 306 may be an area configured to receive user input via a finger, a stylus, or the like, and may be configured to control one or more electronic devices, as appropriate or desired. The pointer circuitry 308 may be configured to interact with an on-screen menu displayed on the TV/monitor 120, for example, by moving and pointing the remote control device 112 at items of the on-screen menu and/or controlling a cursor thereof.

The remote control device 112 may also include auxiliary device control circuitry $310_1$ through $310_N$ for each of a plurality of auxiliary electronic devices that the remote control device is configured to control, such as the components 120, 130, 140, 150 and/or 160. Each of the auxiliary device control circuitry $310_1$ through $310_N$, STB control circuitry 304, touchpad circuitry 306, and pointer circuitry 308 may be coupled to the circuitry controller 300. The circuitry controller 300 is in turn coupled to a timer 312, so that a duration of a sleep/vacation mode may be set as discussed herein.

The CPU/circuitry controller 200 of the STB/receiver 110 may be configured to control the various circuitry $204_1$, $204_2$ through $204_N$ and to place the STB/receiver 110 in one of several modes. For example, the STB/receiver 110 may have an on mode in which the various circuitry $204_1$, $204_2$ through $204_N$ may be active and/or available for use. In other words, in the on mode, the STB/receiver 110 may be configured to perform a certain number of operations by employing the various circuitry $204_1$, $204_2$ through $204_N$. The STB/receiver 110 may have an off/standby mode in which at least some, if not most, of the operations that the STB/receiver 110 is configured to perform in the on mode are not performed or performable. Thus, one or more of the various circuitry $204_1$, $204_2$ through $204_N$ may be inactive or unavailable when the STB/receiver is in the off/standby mode. In general, on and off/standby modes are well understood in the art for electronic devices, and any suitable configuration of these modes is contemplated for the systems and methods described herein.

Further, the STB/receiver 110 may have an additional mode, that is, a sleep/vacation mode, in which the operations that are performed or performable in the off/standby mode are either performed less often or suspended. Information regarding the modes and/or settings for the modes may be stored in the memory 206. The mode information/settings may be predetermined and fixed, may be set to a default and user adjustable, or may be initially set and updated remotely by other than the user, as appropriate or desired.

Further, such information may be stored in a suitable memory or storage device in the remote control device 112. For example, the remote control device 112 may be configured to store information for restoring and/or replacing a STB/receiver 110, such as timers for automatically recording programs. In particular, the remote control device 112 may store a standing vacation mode timer that is set to have the STB/receiver 110 enter the sleep/vacation mode during the work day.

STB/receiver—TV/monitor interfaces may require the TV/monitor to synchronize to the STB/receiver signal in a manner that may involve a significant amount of time. Thus, a STB/receiver may drive an innocuous signal during a typical standby/off mode to allow for an "instant on" when a user turns the STB/receiver on. To reduce power consumption at the expense of instant on performance, various embodiments described herein contemplate a sleep/vacation mode in which the STB/receiver does not drive the innocuous standby signal.

Similarly, STB/receivers may need to be synchronized to an input signal, for example, from the satellite/satellite dish. In a typical standby/off mode, the STB/receiver may remain "on" to be synchronized to the signal. That is, sufficient circuitry of the STB/receiver continues to consume power in the standby/off mode to maintain the synchronization. Various embodiments described herein contemplate a sleep/vacation mode in which the STB/receiver does not maintain the synchronization with the satellite or other source signal. Thus, as a trade-off for reduced power consumption in the sleep/vacation mode, the STB/receiver may have to reacquire the signal and resynchronize to the signal upon returning to the standby/off mode or the on mode.

STB/receivers may also be configured to decode and store information from the signal during a typical standby/off mode. For example, the STB/receiver may continue to decode and store current EPG information and/or program information. Thus, upon exiting the standby/off mode to the on mode, the user may have immediate access to up to date and complete EPG information and/or may be able to time-shift to view a program or portion stored in a buffer. Various embodiments described herein contemplate a sleep/vacation mode in which the STB/receiver does not continue to decode and store information such as EPG information, allowing the EPG information to get out of date. A sleep/vacation timer may be configured to activate decoding and storing of the EPG information a suitable period of time prior to or upon completion of the sleep/vacation mode timer. If a user was to turn on the STB/receiver upon completion of the sleep/vacation mode, the up-to-date EPG information may not immediately be available unless the decoding and storing operations are activated sufficiently before the completion of the sleep/vacation timer. However, it may be acceptable to have the decoding and storing operations activated upon completion of the sleep/vacation timer, as the user may not require the EPG information immediately.

The remote control device 112 may have similar modes, and may, as appropriate or desired, have its modes linked to the modes of the STB/receiver 110. It should be understood that such interrelationship may exist between the remote control device 112 and any or all of the electronic devices that it controls, as appropriate or desired. It should also be understood that the modes of the remote control device 112 may be independent of the STB/receiver 110 or other controlled electronic devices as well. Thus, it should be understood that the configuration and operation of the modes in the remote control device 112 may be similar to that described with respect to the STB/receiver 110. Also, it should be understood that the setting of a mode in one of the STB/receiver 110 and the remote control device 112 may automatically set the mode in the other, and vice versa.

The STB/receiver 110 may be placed in the sleep/vacation mode based on user input. For example, a user may set the STB/receiver to the sleep/vacation mode by providing input via a control panel (not shown) of the STB/receiver 110 or via the remote control device 110, such as by pressing a button and/or navigating a user menu. User input to place the STB/receiver 110 in the sleep/vacation mode may also place the remote control device 112 in the sleep/vacation mode.

Accordingly, it should be understood that the sleep/vacation mode may be entered manually. Similarly, the sleep/vacation mode may be exited manually. For example, the user may press a button on the STB/receiver 110 or on the remote control device 112 to cause the STB/receiver 110 and/or the remote control device 112 to exit the sleep/vacation mode whenever desired by the user. This may be accomplished by any non-specific user interaction with the STB/receiver 110 or the remote control device 112, or may require a particular button(s) to be pressed. Further, the user may be able to specify whether the mode is changed to the on mode, for example, when the user wishes to use the STB/receiver 110 and/or the remote control device 112, or to the off/standby mode, for example, when the user does not intend to use the STB/receiver 110 or the remote control device 112 presently, but wishes to have the suspended and/or less frequently occurring operations resumed or restored.

The sleep/vacation mode may also be programmed, for example, by user input. The user may set the timer(s) 210, 312 to determine a duration that the STB/receiver 110 and/or the remote control device 112 will stay in the sleep/vacation mode. The STB/receiver 110 or the remote control device 112 may then automatically exit the sleep/vacation mode upon expiration of the timer(s) 210, 312, to either the on mode or the off/standby mode, as appropriate or desired. Additionally, the STB/receiver 110 and/or the remote control device 112 may be configured to "wake up" prior to expiration of the timer(s) to allow one or more operations to be performed in anticipation of exiting the sleep/vacation mode. For example, the STB/receiver 110 may, while still in the sleep/vacation mode, wake up sufficiently prior to expiration of the timer 210 to perform an update of the EPG information so that the EPG is current as soon as the sleep/vacation mode is exited and the STB/receiver 110 is ready to use with current EPG information.

The programming of the sleep/vacation mode may be extended to include setting the STB/receiver 110 and/or the remote control device 112 to enter the sleep/vacation mode at a future date/time and exit the sleep/vacation mode at a future date/time. For example, a user may wish to program the STB/receiver 110 to enter the sleep vacation mode for the time the user will be gone on a trip away from home. The user may set a beginning day and/or time and an ending day and/or time for the sleep/vacation mode, and store this as an instance of timer 210 or as an entry in the memory 206. As such, it should be understood that the timer 210 may be configured as instances of timers as well as a physical timing device. Thus, the user may be able to set and store multiple instances of timers for the CPU/circuitry controller 200 to access and control the mode of the STB/receiver 110, that is, place the STB/receiver 110 into and out of the sleep/vacation mode in accordance with the stored timers.

The programming of the sleep/vacation mode may also be extended to include setting the STB/receiver 110 and/or the remote control device 112 to enter the sleep/vacation mode periodically. For example, the user may have regular hours for sleeping, being away from home for work, or other recurring events during which the user wishes the STB/receiver to be in the sleep/vacation mode. The user may be able to set recurring timers for such events so that the STB/receiver 110 automatically enters and exits the sleep/vacation mode without further user interaction.

In some embodiments, any programming of the sleep/vacation mode may be overridden by the user using the STB/receiver 110 and/or the remote control device 112, as appropriate or desired. In some embodiments, such overriding may not undo the programming but may cause the STB/receiver 110 and/or the remote control device 112 to temporarily exit the sleep/vacation mode. The STB/receiver 110 and/or the remote control device 112 may then return to the sleep/vacation mode, either upon reaching the next programmed timer or after a time out period of inactivity of the STB/receiver 110 and/or the remote control device 112. For example, if the STB/receiver 110 and/or the remote control device 112 do not receive user input for a predetermined period of time while still within the duration of the programmed timer, the STB/receiver 110 and/or the remote control device 112 may automatically return to the programmed timer and the sleep/vacation mode set thereby.

The operations of the CPU/circuitry controller 200 and the circuitry controller 300 may be extended similarly to the other electronic devices coupled to the auxiliary I/O devices $204_{1-N}$ and configured to be controlled via the auxiliary device control circuitry $310_{1-N}$. Thus, in general, the circuitry controller 300 may be configured to control the operations and modes of the various circuitry of the remote control device 112, and may be configured to interact with the STB/receiver 110 and/or other controlled devices to set corresponding modes, as discussed above.

Figure 4:
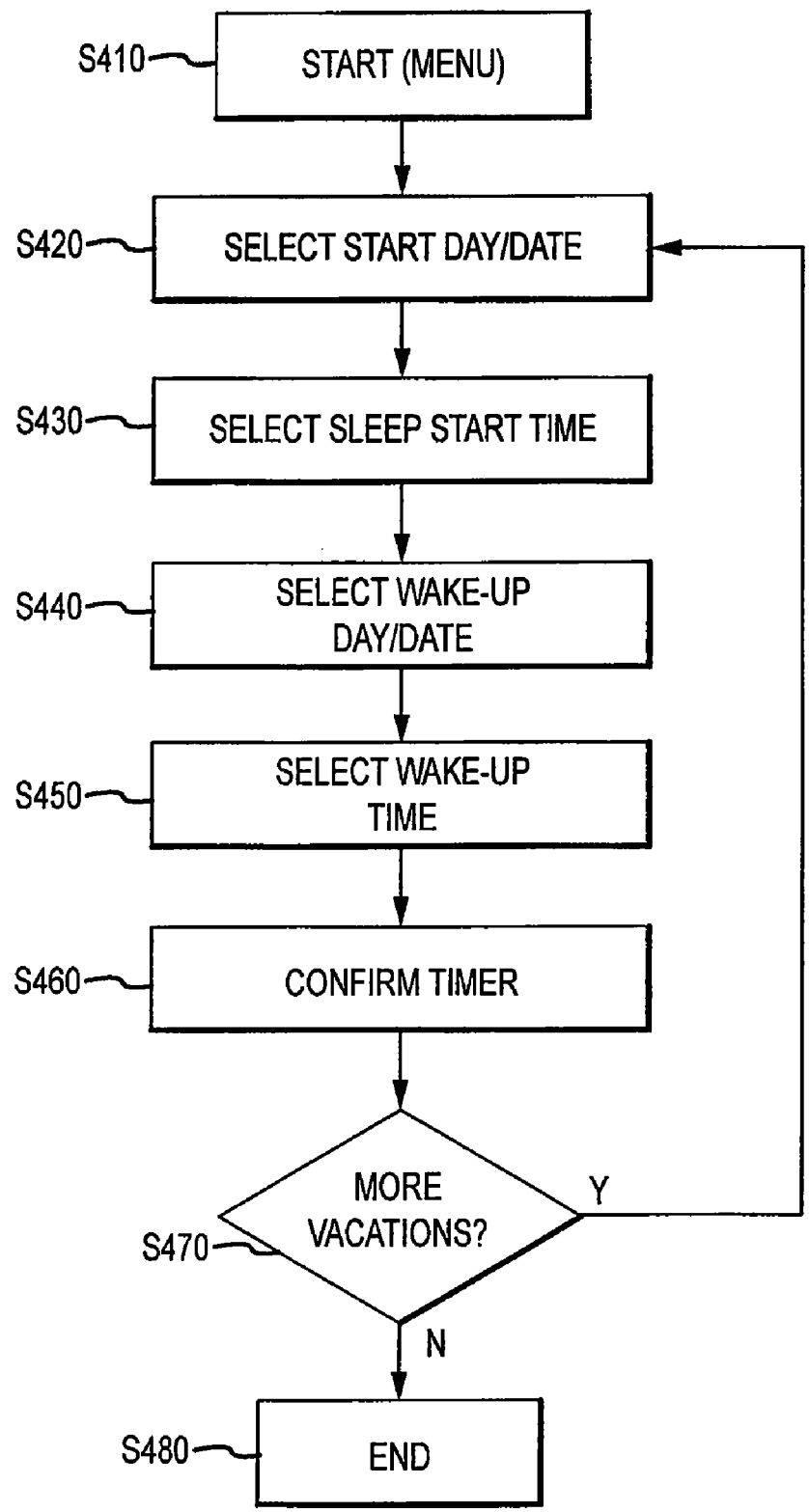
FIG. 4 is a flowchart illustrating a method of setting a vacation timer for an electronic device.
Figure 5:
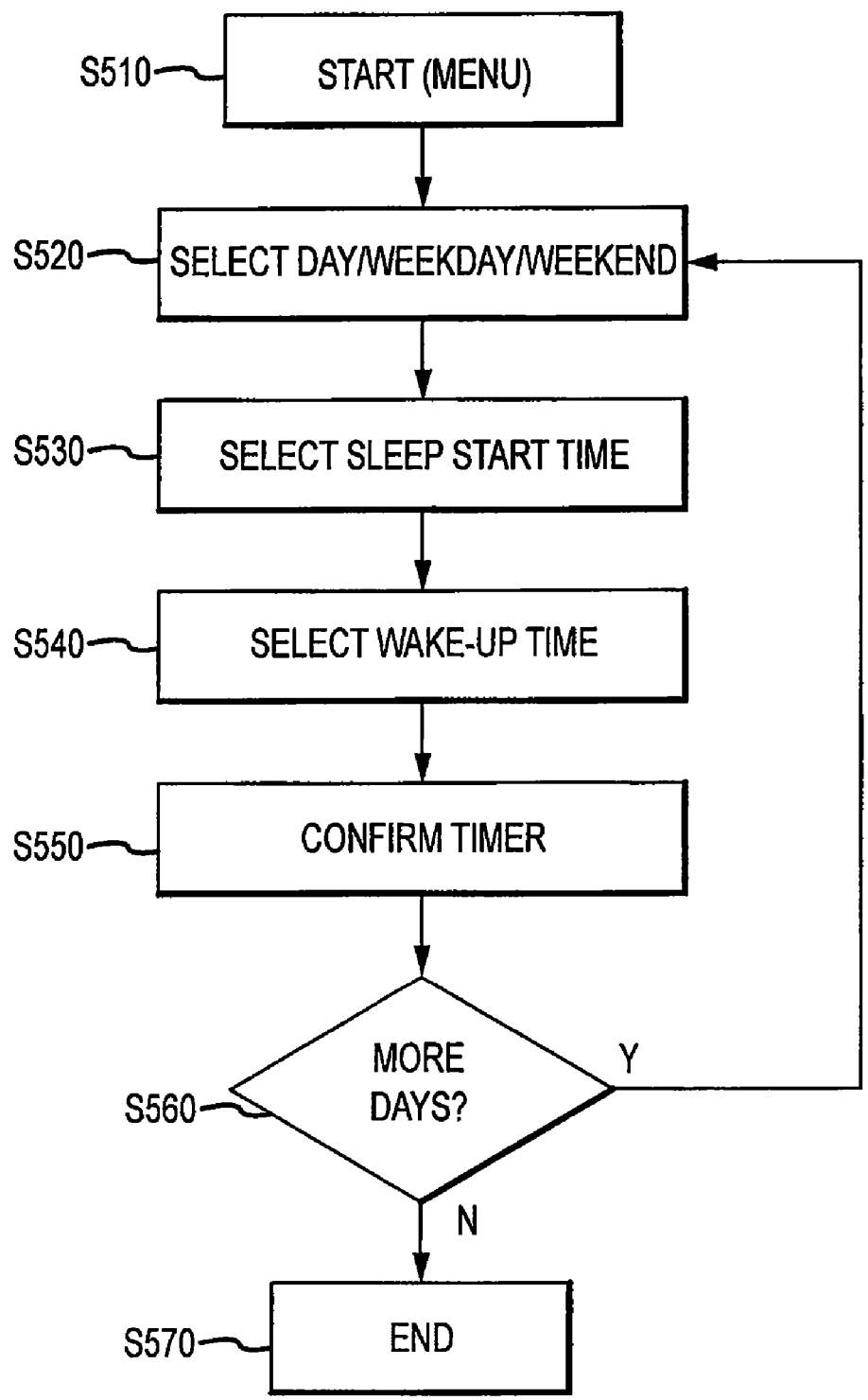
FIG. 5 is a flowchart illustrating a method of setting a sleep timer for an electronic device.
Figure 6:
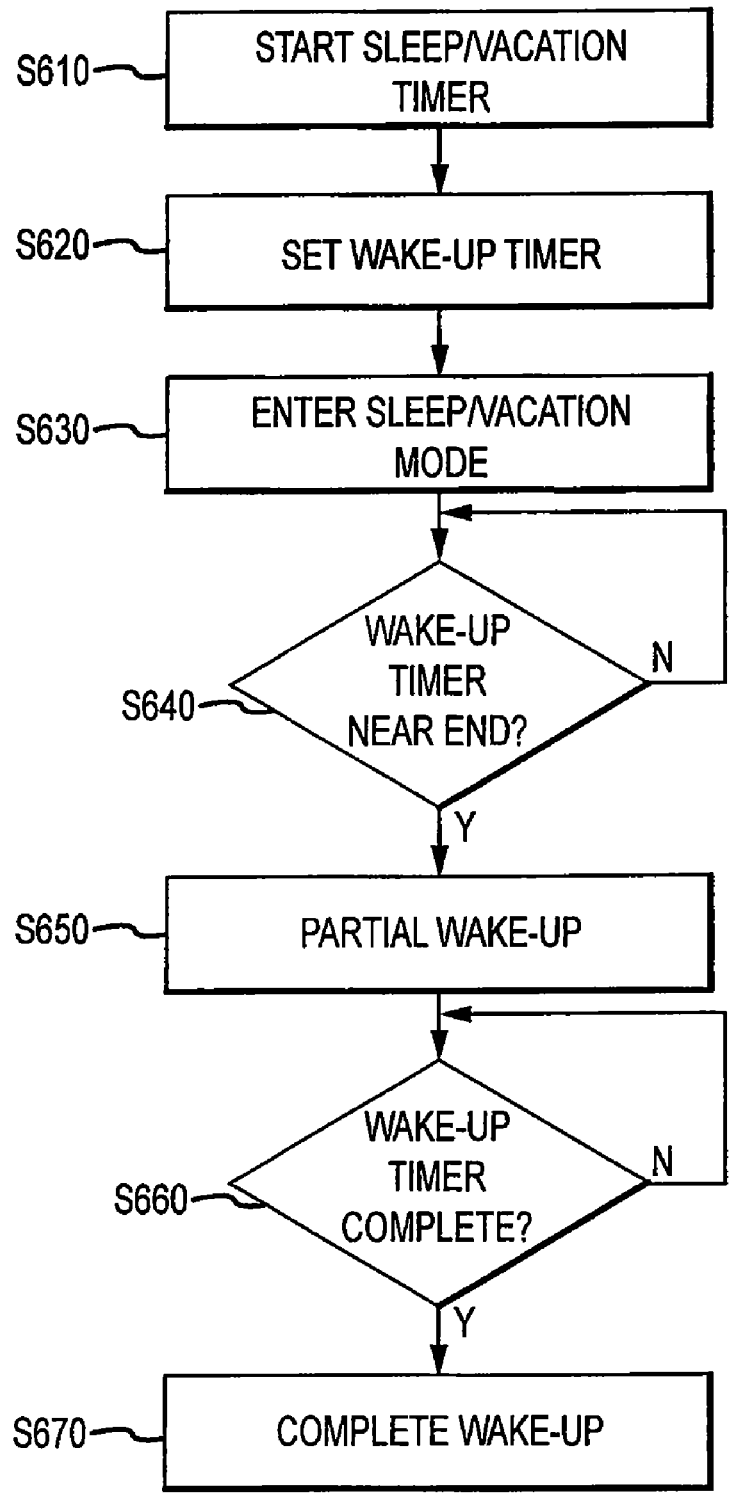
FIG. 6 is a flowchart illustrating a method of controlling power consumption in an electronic device by setting a sleep timer and/or a vacation timer.

Although various methods will be apparent based on the foregoing discussion, examples of methods are provided in the flowcharts of FIGS. 4-6.

FIG. 4 is a flowchart illustrating a method of setting a vacation timer for an electronic device. Such a timer may be set, for example, to allow a reduction in power consumption during extended absences, such as a vacation away from home where the STB/receiver resides. The process may begin at S410, for example, by selection of a menu, and continue to S420, where a day or date for starting the vacation timer to cause the STB/receiver and/or the remote control device to enter the sleep/vacation mode may be set. Optionally, at S430, a particular time may also be set for starting the sleep/vacation mode. Next, at S440, a day or date for ending the vacation timer to cause the STB/receiver and/or the remote control device to exit the sleep/vacation mode may be set. Optionally, at S450, a particular time may also be set for ending the sleep/vacation mode. Also optionally, a user may be asked to confirm the settings for the vacation timer at S460. A determination may be made at S470 whether another vacation timer is to be set. If so, control may return to S420. Otherwise, the process may proceed to S480 and end.

FIG. 5 is a flowchart illustrating a method of setting a sleep timer for an electronic device. Such a timer may be set for recurring absences and/or periods of non-use, such as normal work days/hours and/or sleeping hours. The process may begin at S510, for example, by selection of a menu, and continue to S520, where a selection may be made between individual days, weekday and weekends, allowing a sleep timer to be set to recur every week on a particular day (e.g., Monday), to recur every weekday, or to recur every weekend (e.g., Saturday and Sunday). It should be understood that other recurrences may be set for other time periods, as appropriate or desired, such as, bi-weekly, monthly, or the like. Next, at S530, a time may be set for starting the sleep/vacation mode. Then, at S540, a time may be set for ending the sleep/vacation mode. Optionally, a user may be asked to confirm the settings for the sleep timer at S550. A determination may be made at S560 whether another sleep timer is to be set. If so, control may return to S520. Otherwise, the process may proceed to S570 and end.

FIG. 6 is a flowchart illustrating a method of controlling power consumption in an electronic device by setting a sleep timer and/or a vacation timer. The process may begin at S610 where a sleep or vacation timer is started to place the STB/receiver in a sleep/vacation mode. Based on the settings of the sleep/vacation timer, such as discussed above, a wake-up timer may be set in S620. The STB/receiver may then enter the sleep/vacation mode to reduce or even eliminate its power consumption. For example, the STB/receiver may be configured to: turn off outputs, spin down/shut down the hard disk drive, turn off the radio frequency (RF) front ends, turn off backlighting/LEDs, stop refreshing its RAM, and/or place its CPU in a sleep or hibernate condition in which most processes are shut down.

Optionally, a signal may be sent from the STB/receiver to a corresponding remote control device to cause the remote control device to enter a sleep/vacation mode as well. The sleep/vacation mode for the remote control device may similarly reduce power consumption by eliminating one or more on-going operations of the remote control device that occur in its standby mode (i.e., in the absence of user input), such as polling the STB/receiver. For example, the remote control device may be placed in a sleep/vacation mode in which no operations are active, other than possibly a power-up operation, to allow the vacation/sleep mode to be interrupted or overridden, for example, by pressing a power button on the remote control device.

Once the STB/receiver is in the sleep/vacation mode, a monitor or trigger may be used to cause a partial wake up of the STB/receiver. For example, at S640, a determination may be made as to whether the wake-up timer is near its end. If so, at S650, the STB/receiver may wake up partially to enable certain operations to resume prior to expiration of the sleep/vacation timer. For example, the CPU may become active, the RAM may be initialized, the EPG information may be updated, other updates as needed, and the like. In general, operations that prepare the STB/receiver for use upon expiration of the sleep/vacation timer may be enabled.

Similarly, a monitor or trigger may be used to cause a complete wake up of the STB/receiver upon completion of the wake-up timer. For example, at S660, a determination may be made as to whether the wake-up timer is complete. If so, at S670, the STB/receiver may complete its wake up, exiting the sleep/vacation mode to be ready for normal use. For example, the STB/receiver may exit the sleep/vacation mode to enter the standby/off mode and have all operations that are active in the standby/off mode enabled. Further, a signal may be sent from the STB/receiver to the remote control device to cause the remote control device to exit its sleep/vacation mode and enter a standby/off mode as well.

It should be understood that the flowcharts of FIGS. 4-6 are only examples, and that other methods, whether by addition of operations, omission of operations, and/or reordering of operations, may be envisioned. For example, the flowcharts of FIGS. 4-6 do not illustrate various "starting" configurations of the mode(s) of the electronic device(s) or the remote control device(s) that are possible. Instead, it should be understood that any suitable flow of operations may be determined as appropriate or desired for a given arrangement of electronic devices and remote control device(s) based on the description provided herein.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method of controlling power consumption in an electronic device including at least three modes, the method comprising:
   from either a first mode of the electronic device in which first circuitry of the electronic device is configured to perform a first operation or a second mode of the electronic device in which second circuitry of the electronic device is configured to perform a second operation, entering a third mode of the electronic device for a set period of time in response to an input, the third mode configuring the electronic device to control the second circuitry to reduce a frequency of or suspend performance of the second operation; and
   signaling an associated electronic device, that is associated with the electronic device and is configurable to operate in a first associated electronic device mode, a second associated electronic device mode, and a third associated electronic device mode, to enter the third associated electronic device mode when the electronic device enters the third mode;
   wherein the associated electronic device performs fewer operations in the third associated electronic device mode than in the second associated electronic device mode and fewer operations in the second associated electronic device mode than in the first associated electronic device mode; and
   wherein operations performed by the electronic device in the first mode, the second mode, and the third mode are user configurable.

2. The method of claim 1, further comprising restoring the frequency of or resuming performance of the second operation when the electronic device is changed from the third mode to one of the first mode and the second mode.

3. The method of claim 1, wherein entering the third mode is in accordance with a timer.

4. The method of claim 3, further comprising restoring the frequency of or resuming performance of the second operation upon expiration of the timer.

5. The method of claim 3, further comprising restoring the frequency of or resuming performance of the second operation prior to expiration of the timer.

6. The method of claim 3, wherein the timer is set to occur periodically.

7. An electronic device, comprising:
first circuitry configured to perform a first operation when the electronic device is in a first mode;
second circuitry configured to perform a second operation when the electronic device is in a second mode; and
a controller configured to control the second circuitry to reduce a number of occurrences of or suspend performance of the second operation when the electronic device is in a third mode and to signal an associated electronic device, that is associated with the electronic device and is configurable to operate in a first associated electronic device mode, a second associated electronic device mode, and a third associated electronic device mode, to enter the third associated electronic device mode when the electronic device enters the third mode;
wherein the associated electronic device performs fewer operations in the third associated electronic device mode than in the second associated electronic device mode and fewer operations in the second associated electronic device mode than in the first associated electronic device mode; and
wherein operations performed by the electronic device in the first mode, the second mode, and the third mode are user configurable.

8. The device of claim 7, wherein the circuitry controller is configured to restore the number of occurrences of or resume performance of the second operation when the electronic device changes from the third mode to one of the first and the second mode.

9. The device of claim 7, further comprising a timer configured to set a duration of the third mode for the electronic device.

10. The device of claim 9, wherein the circuitry controller is configured to restore the number of occurrences of or resume performance of the second operation upon expiration of the timer.

11. The device of claim 10, wherein the circuitry controller is configured to restore the number of occurrences of or resume performance of the second operation prior to expiration of the timer.

12. The device of claim 9, further comprising a timer controller configured to set the timer.

13. The device of claim 12, wherein the timer controller is configured to set the timer to occur periodically.

14. A remote control device, comprising:
first circuitry configured to receive user input to wirelessly control an electronic device;
second circuitry configured to perform at least one operation without user input; and
a circuitry controller configured to control the second circuitry based on a mode of the remote control device or the electronic device wherein: the remote control device and the electronic device are each configurable to operate in a first mode, a second mode, and a third mode, the electronic device performs fewer operations in the third mode than in the second mode and fewer operations in the second mode than in the first mode, the remote control device performs fewer operations in the third mode than in the second mode and fewer operations in the second mode than in the first mode, and the circuitry controller configures the remote control device to operate in the third mode upon receiving an indication transmitted by the electronic device when the electronic device enters the third mode;
wherein operations performed by the electronic device in the first mode, the second mode, and the third mode are user configurable.

15. The device of claim 14, wherein the circuitry controller is configured to suspend performance of the at least one operation based on the mode of the remote control device or the electronic device.

16. The device of claim 15, wherein the circuitry controller is configured to resume performance of the at least one operation upon receipt of one of a signal from the electronic device and a user input.

17. The device of claim 15, further comprising a timer, wherein the circuitry controller is configured to set the timer based on the mode of the remote control device or the controlled electronic device and to resume performance of the at least one operation upon expiration of the timer.

18. The device of claim 14, wherein the circuitry controller is configured to reduce a frequency of performance of the at least one operation based on the mode of the remote control device or the electronic device.

19. The device of claim 18, wherein the circuitry controller is configured to restore the frequency of performance of the at least one operation upon receipt of one of a signal from the electronic device and a user input.

20. The device of claim 18, further comprising a timer, wherein the circuitry controller is configured to set the timer based on the mode of the remote control device or the electronic device and to restore the frequency of performance of the at least one operation upon expiration of the timer.

21. A method of operating an entertainment device, comprising:
operating the entertainment device in a first power state;
operating the entertainment device in a second power state, the power consumption of the entertainment device in the second power state being less than the power consumption of the entertainment device in the first power state;
receiving input requesting to operate the entertainment device in a third power state, the input including a specified time period wherein operations performed by the electronic device in the first mode, the second mode, and the third mode are user configurable;
operating the entertainment device in the third power state in response to the input, the power consumption of the entertainment device in the third power state being less than the power consumption of the entertainment device in the first power state and the power consumption of the entertainment device in the third power state being different than the power consumption of the entertainment device in the second power state;
signaling an electronic device, that is associated with the entertainment device and is configurable to operate in a first electronic device operating mode, a second electronic device operating mode, and a third electronic device operating mode, to enter the third electronic device operating mode when the entertainment device enters the third mode wherein the electronic device performs fewer operations in the third electronic device mode than in the second electronic device mode and fewer operations in the second electronic device mode than in the first associated device mode; and switching the entertainment device from the third power state to the first power state or the second power state based on expiration of the specified time period.

22. The method of claim 21, wherein receiving input comprises receiving user input.

23. The method of claim 21, wherein the power consumption of the entertainment device in the third power state is less than the power consumption of the entertainment device in the second power state.

24. The method of claim 21, further comprising outputting presentation content from the entertainment device during the first power state.

25. The method of claim 21, wherein the first power state is an active power state, the second power state is a standby power state and the third power state is a vacation power state or a sleep power state.

* * * * *